United States Patent
Kloth

(10) Patent No.: US 6,598,034 B1
(45) Date of Patent: Jul. 22, 2003

(54) RULE BASED IP DATA PROCESSING

(75) Inventor: Axel K. Kloth, Milpitas, CA (US)

(73) Assignee: Infineon Technologies North America Corp., San Jose, CA (US)

( * ) Notice: Subject to any disclaimer, the term of this patent is extended or adjusted under 35 U.S.C. 154(b) by 0 days.

(21) Appl. No.: 09/401,030

(22) Filed: Sep. 21, 1999

(51) Int. Cl.$^7$ .................. G06F 17/00; G06F 15/173; H04Q 7/24
(52) U.S. Cl. .................. 706/47; 709/223; 709/224; 370/338
(58) Field of Search .............. 706/47, 45; 717/141; 709/223–225, 230, 236, 238; 707/3; 370/338

(56) References Cited

U.S. PATENT DOCUMENTS

| | | | |
|---|---|---|---|
| 5,642,513 A | | 6/1997 | Schnellinger et al. ....... 717/141 |
| 5,781,550 A | * | 7/1998 | Templin et al. .............. 370/401 |
| 5,793,954 A | | 8/1998 | Baker et al. ................. 709/250 |
| 5,842,040 A | | 11/1998 | Hughes et al. ................ 710/11 |
| 5,864,666 A | * | 1/1999 | Shrader ....................... 709/229 |
| 5,872,783 A | | 2/1999 | Chin ....................... 370/395.32 |
| 5,903,559 A | | 5/1999 | Acharya et al. ............. 370/355 |
| 6,154,776 A | * | 11/2000 | Martin ........................ 370/390 |
| 6,167,395 A | * | 12/2000 | Beck et al. ...................... 707/3 |
| 6,170,011 B1 | * | 1/2001 | Macleod Beck et al. ... 709/224 |
| 6,246,684 B1 | * | 6/2001 | Chapman et al. ........... 370/363 |
| 6,332,154 B2 | * | 12/2001 | Beck et al. ................... 709/204 |
| 6,452,915 B1 | * | 9/2002 | Jorgensen .................... 370/338 |
| 2001/0025309 A1 | * | 9/2001 | Beck et al. .................. 709/223 |
| 2002/0095462 A1 | * | 7/2002 | Beck et al. .................. 709/204 |
| 2002/0099854 A1 | * | 7/2002 | Jorgensen .................... 709/249 |

FOREIGN PATENT DOCUMENTS

WO    WO 97/28505    8/1997    ........... G06F/13/14

OTHER PUBLICATIONS

Miei et al., Parallelization of IP–Packet Filter Rules, 3rd International Conference on Algorithms and Architectures for Parallel Processing, Dec. 1997, pp. 381–388.*

(List continued on next page.)

Primary Examiner—John Follansbee
Assistant Examiner—Kelvin Booker
(74) Attorney, Agent, or Firm—Fish & Richardson P.C.

(57) ABSTRACT

A apparatus and method that provides a routing engine for processing data packets based upon certain rules that are compiled and applied real-time via a just-in-time (JIT) compiler, a runtime compiler, or the like. The routing engine parses and analyzes an incoming IP flow. A set of rules are developed and stored for use by the JIT. The rules establish a set of patterns, and the incoming data is compared to those patterns. If certain patterns are detected, then the associated action established by the rule is applied to the processing of the data packet. Packets are classified according to any rule, as applied to any packet, as early as possible in the process (i.e. first or second stage of process), with the route lookup and packet attribute processes performed in parallel. Data packets might be assigned or mapped to various traffic service levels. Traffic types and priorities, as well as service levels, can be mapped onto existing QoS/CoS definitions and assignments. The data packets can be altered or modified as a result of the detected patterns. Data packets can also be discarded or dropped if the detected patterns and associated rule indicate such a desire. The apparatus and method might be implemented as a hardware and software configuration. A software configuration might also be loaded into existing router hardware.

29 Claims, 10 Drawing Sheets

OTHER PUBLICATIONS

Begel et al., BPF+: Exploiting Global Data–Flow Optimization in a Generalized Packet Filter Architecture, Proceedings of the Conference on Applications, Technologies, Architectures and Protocols for Computer Communications, Aug. 1999, pp. 123–134.*

Campbell et al., Open Signaling for ATM, Internet and Mobile Networks, OPENSIG '98, Oct. 1998, pp. 97–108.*

Williamson et al., Independent Active Program Representation Using ASN.1, ACM SIGCOMM Computer Communication Review, Apr. 1999, vol. 29, Iss 2, pp. 69–88.*

Stoica et al., Providing Guaranteed Services Without Per Flow Management, ACM SIGCOMM Computer Communications Review, Aug. 1999, vol. 29, Iss 4, pp. 81–94.*

Lin et al., Programming Interfaces for IP Routers and Switches, an Architectural Framework Document, NEC Research Index, Jun. 1999.*

Lin et al., Programming Interfaces for IP Networks: A White Paper, NEC Research Index, Jun. 1999.*

* cited by examiner

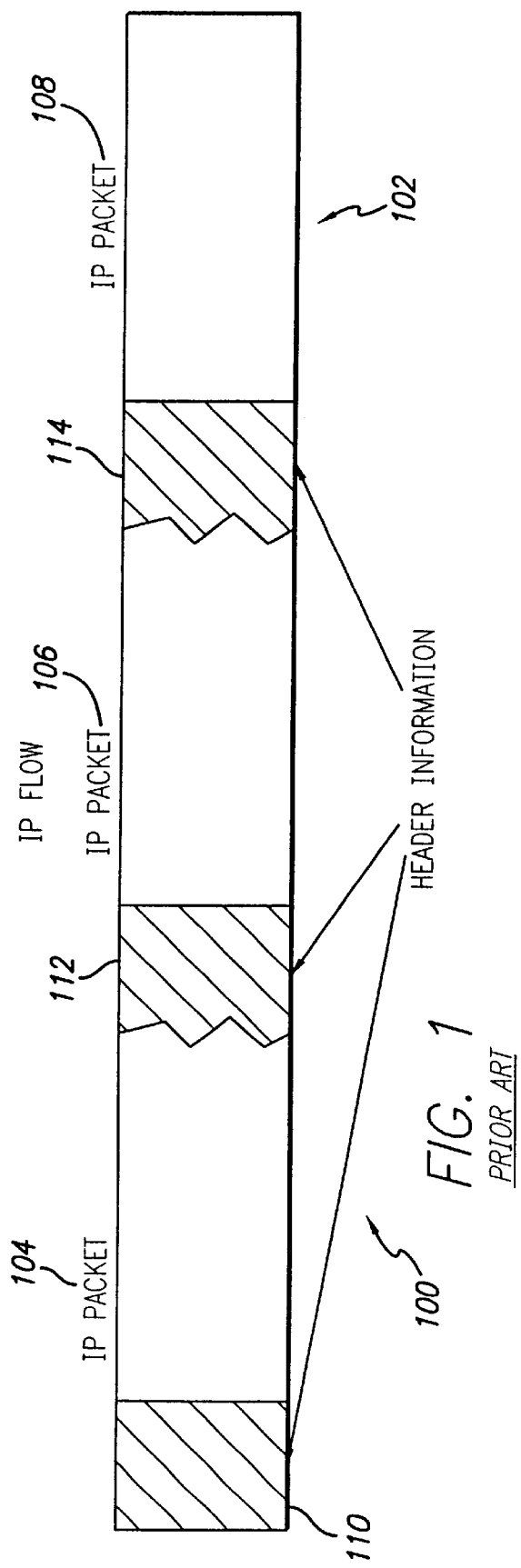
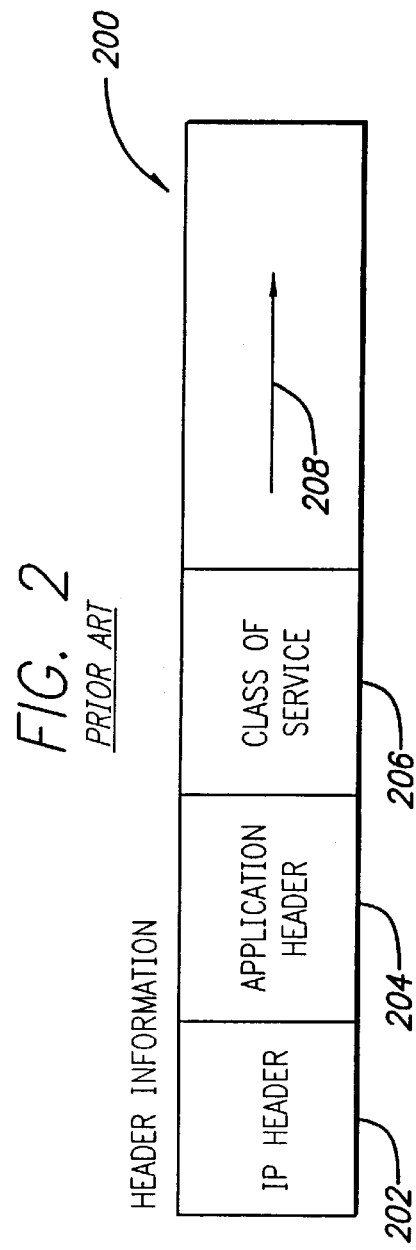

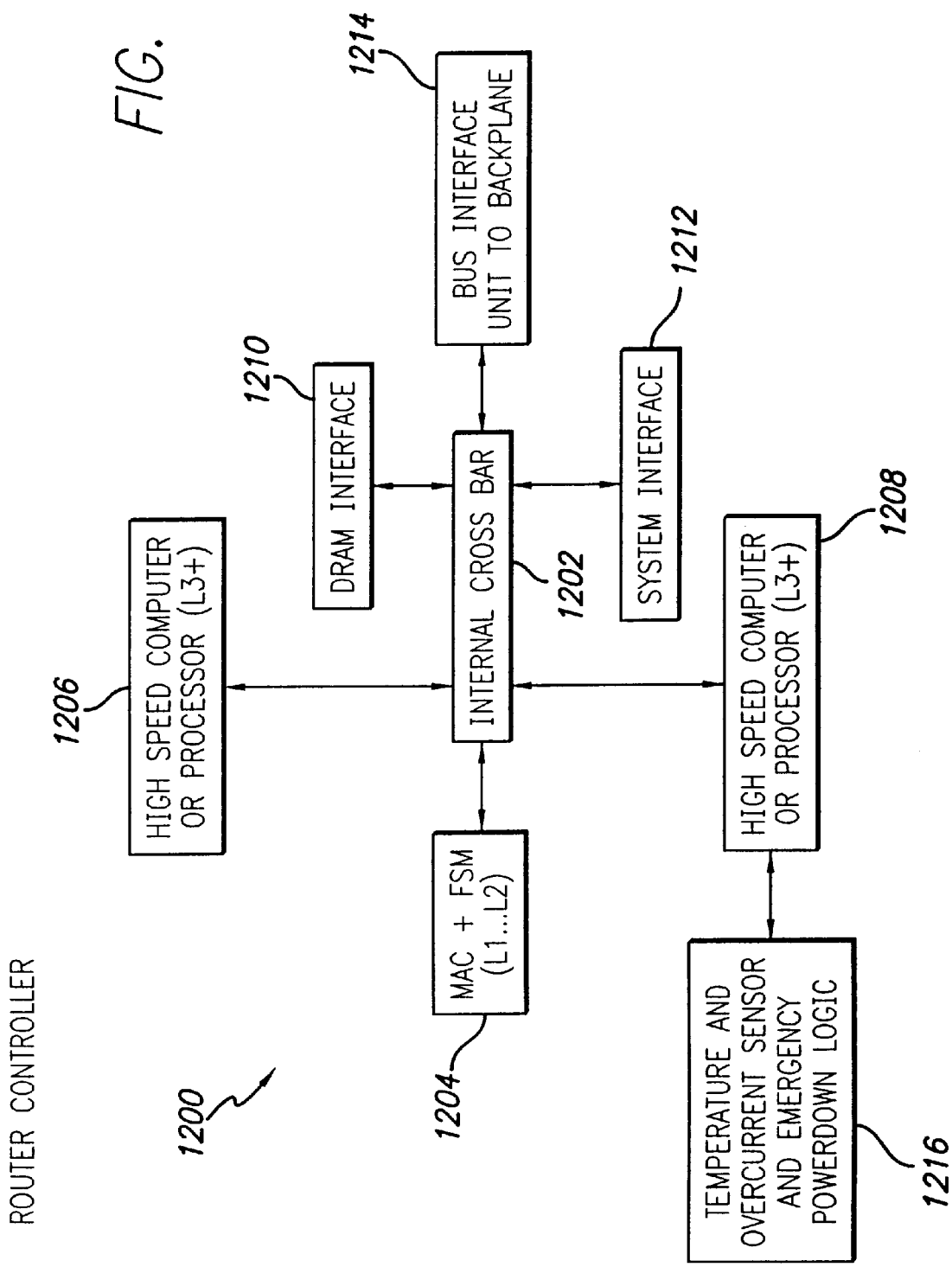

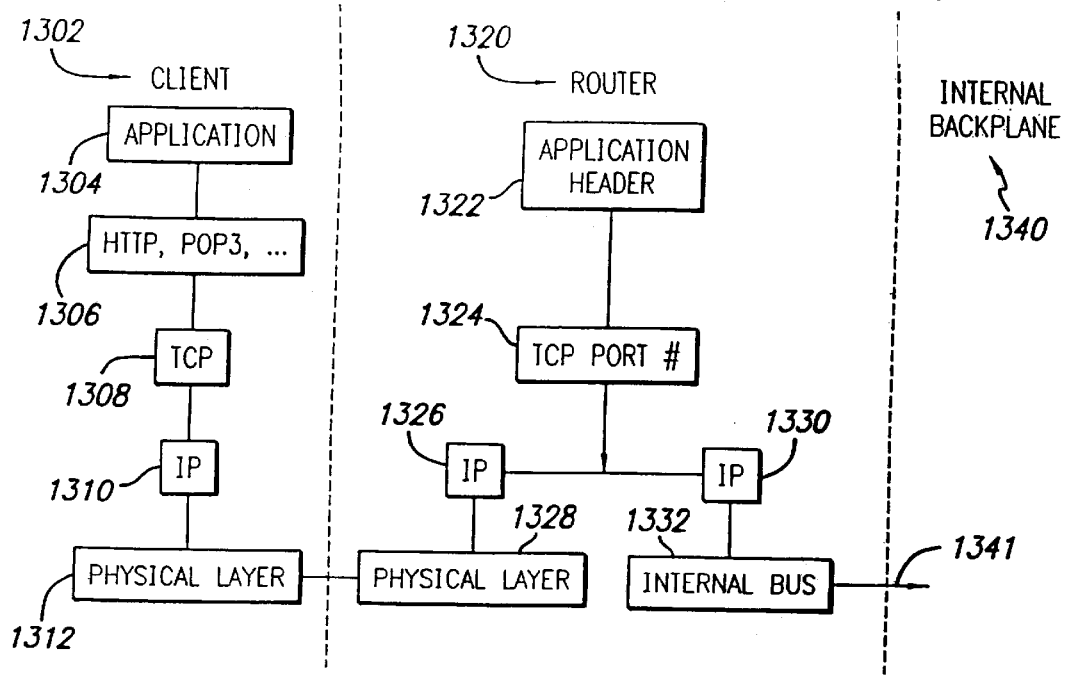
FIG. 13 PROTOCOL STACK IP OVER GIGABIT ETHERNET (GbE)
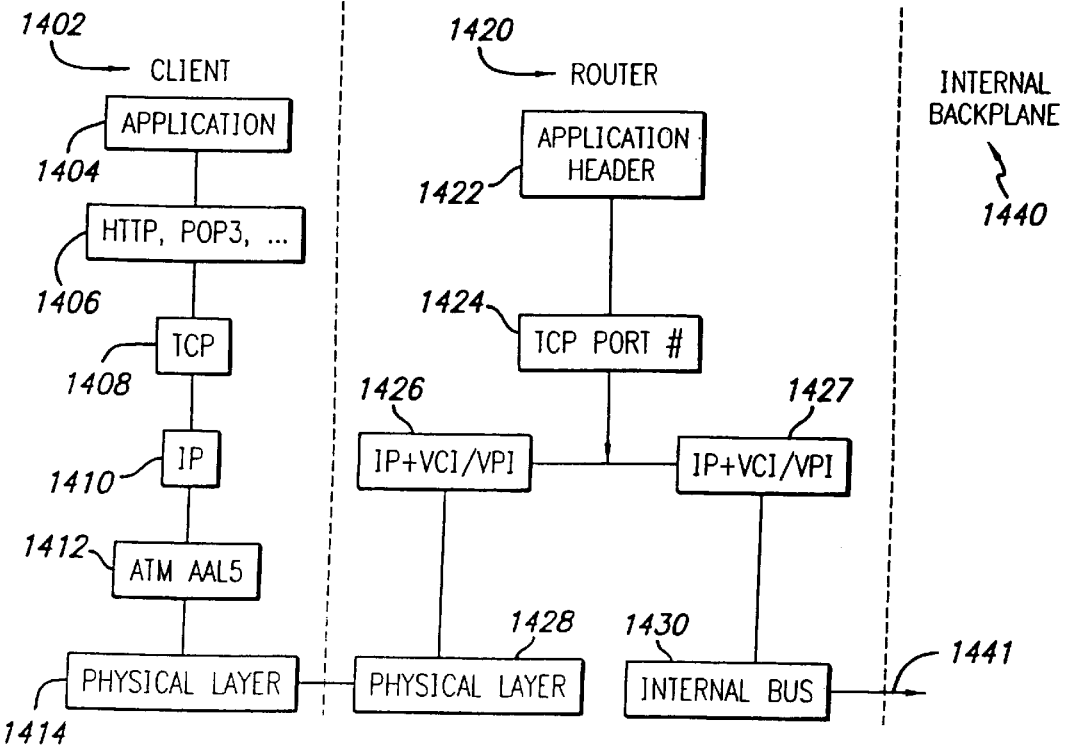
FIG. 14 PROTOCOL STACK IP OVER ATM

RULE BASED IP DATA PROCESSING

FIELD OF THE INVENTION

The present invention relates generally to a real-time and non-real-time method and apparatus for classifying data packets and subsequently processing them according to a set of rules.

BACKGROUND OF THE INVENTION

Internet Protocol (IP) is the method or protocol by which data is sent from one computer to another on the Internet. Internet communication generally uses OSI model type layered software. OSI divides telecommunication into seven layers. The layers are in two groups. The upper four layers are used whenever a message passes from or to a user. The lower three layers (up to the network layer) are used when any message passes through the host computer. Messages intended for this computer pass to the upper layers. Messages destined for some other host are not passed up to the upper layers but are forwarded to another host. The seven layers are:

Layer 7: The application layer—This is the layer at which communication partners are identified, quality of service is identified, user authentication and privacy are considered, and any constraints on data syntax are identified. (This layer is not the application itself, although some applications may perform application layer functions.)

Layer 6: The presentation layer—This is a layer, usually part of an operating system, that converts incoming and outgoing data from one presentation format to another (for example, from a text stream into a popup window with the newly arrived text). This layer is sometimes called the syntax layer.

Layer 5: The session layer—This layer sets up, coordinates, and terminates conversations, exchanges, and dialogs between the applications at each end. It deals with session and connection coordination.

Layer 4: The transport layer—This layer manages the end-to-end control (for example, determining whether all packets have arrived) and error-checking. It ensures complete data transfer.

Layer 3: The network layer—This layer handles the routing of the data (sending it in the right direction to the right destination on outgoing transmissions and receiving incoming transmissions at the packet level). The network layer does routing and forwarding.

Layer 2: The data link layer—This layer provides error control and synchronization for the physical level.

Layer 1: The physical layer—This layer conveys the bit stream through the network at the electrical and mechanical level. It provides the hardware means of sending and receiving data on a carrier.

IP packets flow through all seven layers via routers and the like. On the Internet, a router is a device or, in some cases, software in a computer, that determines the next network point to which a packet should be forwarded toward its destination. The router is connected to at least two networks and decides which way to send each information packet based on a current understanding of the state of the networks to which it is connected. A router is located at any juncture of networks or a gateway, including each Internet point-of-presence (POP). In general, a router creates or maintains a table of the available routes and their conditions and uses this information along with distance and cost algorithms to determine the best route for a given packet. Typically, a packet may travel through a number of network interconnects with routers before arriving at its destination.

The bandwidth on any particular network is limited. As a result is becomes important to manage and direct the transport of packets across the network paths in order to maximize use of such bandwidth.

Current routers receive an IP packet. The router looks at the IP source and destination address, which is Layer 3 information. The MAC address—which is Layer 2—has already been dealt with in the MAC. Based on the routing table entry and on the link capacity, the router forwards the packet to the output port. If the output port is congested or the link blocked, the packet is either buffered or discarded. If the particular router deals with other Layers as well, it does so sequentially, after already determining the output port (i.e. classification on Level 2/3, and forwarding). The Router then reads the payload of the packet again and figures out what to do next. As a result, another lookup is necessary, this time for the actual Level 3++ information. If the packet can be buffered, if it can be postponed, rerouted, discarded, etc. The packet might also be tagged, as the next hop (i.e. the next router on the way) can generally understand tagged packets and prioritize them. For Level 4, the packet is read again, a decision is made, and so forth throughout the various levels.

An example prior art solution includes Neo Networks StreamProcessor which includes a backbone switch router that distinguishes network traffic types and applies certain rules to each class of identified traffic. The StreamProcessor can apply any rule to any packet, but cannot carry out any action. For instance, it is restricted to actions typically carried out by a traditional router. Such actions include forwarding, buffering, or discarding. The StreamProcessor cannot carry out Firewall capabilities, such as dropping packets.

Accordingly, what is needed in the field is a router-based switching system that is processor-based and provides a fully flexible state machine for routing data packets. The configuration should utilize a set of rules for routing the various packets within an IP stream according to patterns along any point within the IP stream. The analyzed patterns would include certain fields within the IP header, and/or data patterns within the payload or the like. The system should analyze entire IP flows (or packets) for such patterns. The switching system should forward a packet (if possible and/or desired) according to Layer 3 information in a first stage. If a packet cannot be forwarded, then a second stage should classify the packet entirely according to rules. The rules can be compiled and applied on-the-fly by a just-in-time compiler. A user or administrator should be able to edit and reapply the rules in a dynamic fashion, without detrimentally affecting service. The system should also provide additional capabilities including Firewalling.

SUMMARY OF THE INVENTION

To achieve the foregoing, and in accordance with the purpose of the present invention, an apparatus and related method are disclosed that will process an IP traffic flow, and perform actions on the data packets. The data packets are processed according to a set of rules that are compiled and applied on a real-time, or wirespeed basis.

Routing today generally consists of classifying the packet, and then doing one or more out of the following: forwarding the packet, dropping the packet (no notification to sender), discarding the packet (with notification to sender, including backpressure), buffering the packet, setting up a stream for subsequent packets of the IP flow or stream, monitoring the packet (or flow, or stream). Routing, however, it is not limited to only these actions. The present system employs a form of Rule Based Routing, wherein a system can apply any rule to any packet, and execute any command desired. This is provides considerable freedom for the Network Administrator, as well as providing power and protection against intruders. This process happens at wirespeed, providing CoS/QoS capabilities, so that the users will benefit therefrom. Due to better network utilization, the carriers and backbone operators benefit as well because the present system allows for a consistently higher average-level of utilization with reduced bursts and peaks.

If the present system cannot route (or it is desirable not to route) the packet based on Layer 3 information (IP address), then the packet is forwarded to the CPU. Such non-routing might come about, for instance, because the system has defined a packet to be monitored, to be discarded (as related to intruder detection, overload and so on), or because the system has not yet set up an IP flow information, and so forth. In this situation, all available layer information (i.e. for layers 2, 3, 4, 5, 6, and 7) is read and used to apply the rules that were defined regarding how to process the packet on any layer. Hence, the present system looks up the destination port and the criteria regarding how to route the packet (or generally speaking processes the packet) simultaneously. For example, a lookup for IP address 192.37.3.1, a TCP port indication HTTP, and application type Netscape would return "destination port 17" and simultaneously "tag packet according to Prioritized Status, route/forward/switch immediately, don't buffer, user has priority, don't monitor, don't discard, don't drop" and so forth. These rules are defined by the Network Administrator (NetAdmin). They are then applied to the router software, or the NMS. The router software or the NMS reduce these terms to the minimum number of logical terms according to Quine-McCluskey or similar methods, and then those rules are placed in the routing table for the packet processing information.

Accordingly, one difference (or advantage) provided by the present system is that conventional routers process both lookups (i.e. destination port comprising forwarding information and packet processing action) sequentially. The present system processes such lookups in parallel. Another difference is that the present system allows any action to be applied to any packet based upon any rule that the NetAdmin might define. In other words, the present system is not restricted.

The present inventor can be configured to perform a variety of tasks which operate on information including (for instance) the OSI layers (i.e. Layers 2–7), the load situation of the router, the outgoing port info, and/or general rules to be applied to all (or certain) packets or IP flows or streams (like monitoring and so on). The information can be applied simultaneously across many different packets. The present system then decides whether to buffer, discard (drop according to Leaky Bucket or other algorithms), monitor, forward the packet, or setup an information stream in order to be able to subsequently forward the following packets of the stream faster and with less computational power involved.

In general, the packet is looked at (or processed) in one (and sometimes two) stages. For performance reasons, stage one might be logically and physically separated. The systems looks at the IP address and decides if the packet can already be routed. If the packet can be routed, then this task is performed, provided that the uplink has capacity, the way though the router is clear, and so forth. If the system cannot decide, then it becomes necessary to classify the packet entirely. In other words, the system figures out the priority, Time To Live, monitoring status, and all other rules to be applied. Accordingly, the present system performs the route lookup in parallel to the lookup of the rest of the attributes of the particular packet, i.e. both lookups are done in parallel. Prior art routers perform differently in that they perform the route lookup, and thereafter they perform the lookup of the rest of the attributes sequentially. Because the present system performs the tasks in parallel, there is less latency. Accordingly, decisions (regarding the packet) can be taken as early as possible.

The present system applies any rule that can be defined, and is applied to every packet at runtime and in real-time. For real-time applications, a JIT (Just In Time) compiler might be used. Otherwise, the rules could be imposed even without the JIT compiler. The rules are reduced to the minimum number of logical terms (e.g. AND/NAND/OR/XOR/EXOR) by the JIT (for instance). The present invention also takes into consideration the router and uplink load situation in the routing process (i.e. the forwarding part) in one or two stages directly in the classification process. This different from prior system which might consider such information later on, for instance, in the outgoing port, a central part of the router, or elsewhere.

The present system thereby presents a new and unique way to classify the packet as early as possible with as much information as possible—from all OSI Layers and from all the rules—to be applied to every IP packet. The present system does not perform the classification sequentially, but instead performs it in full (for the entire IP flow), as early as possible in the process. The more information that is available about a particular packet in the early stages of the process, the better the present system can classify it, and the more efficiently the IP flow can be routed.

According to one aspect of the present invention, a routing engine is provided that performs a variety of operations. The routing engine will receive and parse an incoming IP flow. For the outset, the engine looks at (or analyzes) all parts of the IP flow, for instance the IP header, TCP header, Application header, etc. The engine then decides whether to forward or buffer the data packet. A set of rules are used to define a pattern (or set of patterns) to be analyzed (or compared/matched) in the incoming IP data flow. The rules can be edited or developed via an appropriate graphical interface. The rules can be applied on-the-fly (e.g. real-time or online, etc.) via a just-in-time (JIT) compiler, or the like. The rules might also be imposed at runtime without the use of a JIT compiler. The pattern can be located anywhere within the IP flow, e.g. IP packet headers or packet data. Upon detection of a certain pattern, actions can be performed upon the IP flow and/or individual IP packets. Such actions can include routing decisions, wherein the packet is mapped to a certain routing capability. Such traffic policing capabilities can include Unspecified Bit Rate (UBR), Variable Bit Rate (VBR), Constant Bit Rate (CBR) or their equivalents. The packet can also be buffered for sending later, and/or for evening out traffic loads between various points (or nodes) in a network.

In yet another aspect, the routing assignments are mapped onto existing Quality of Service (QoS) and/or Class of Service (CoS) capabilities.

In still another aspect, the data flow is altered or modified as a result of a detected pattern, which is a function of an associated rule. The detected pattern can be altered or modified. Alternatively, the IP packet itself can be altered or modified. This would include changing (or exchanging) destination addresses, or the like, for data packets.

In still another aspect, the data flow (or packets) might be dropped intermittently, or discarded altogether, as a result of a detected data pattern. For instance, all data packets associated with a certain virus pattern might be dropped or discarded. Packets associated with a certain source address might also be dropped or discarded, if it has been determined that that source address is sending undesired materials.

The present invention therefore supplies traditional routing functions such as L2 switching, L3 routing, and IP switching. In addition, the present invention can provide (among others) the following capabilities: Firewall, Intruder detection, Virus detection, backdoor intrusion protection, load balancing and sharing, network traffic policing, traffic shaping, and SAN as the compelling L7 application on routers.

As a result of such aspects, one benefit or advantage includes the even distribution (over time) of the bandwidth usage on a particular network.

These and other advantages of the present invention will become apparent upon reading the following detailed descriptions and studying the various figures and drawings.

BRIEF DESCRIPTION OF THE DRAWINGS

The invention, together with further advantages thereof, may best be understood by reference to the following description taken in conjunction with the accompanying drawings which:

FIG. 1 is a prior art block diagram showing an IP flow with IP packets and header information.

FIG. 2 is a prior art block diagram of certain representative header fields in the header of any one IP packet.

FIG. 11 illustrates a representative communication protocol stack according to the present invention.

FIG. 12 illustrates a representative router controller configuration according to the present invention.

FIG. 13 illustrates a representative protocol stack for one implementation of the present invention over gigabit ethernet.

FIG. 14 illustrates a representative protocol stack for one implementation of the present invention over ATM.

DETAILED DESCRIPTION OF THE INVENTION

Figure 3:
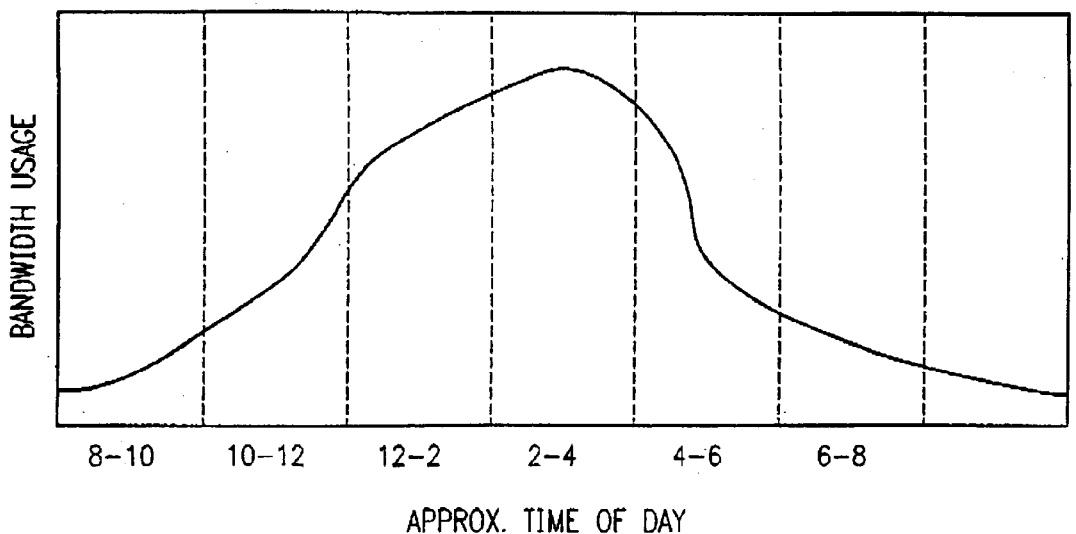
FIG. 3 is a diagram showing bandwidth usage versus the approximate time of day.

The present invention analyzes information for layers 2, 3, 4, 5, 6, and 7—i.e. all available information—and then derives via a single lookup, not only where to route the packet, but also what to do in case of certain situations (which might require further operations to be performed on the packets). A set of rules is developed and applied, which provides certain directions for handling the packets, according to such (conditional) situations. The present system can thereby apply any rule to any packet, and can be used to evoke any action on any packet. The general advantage of the present system is that only a single lookup is performed, and this information comes from all layers 2–7 (as opposed to only layers 2 and 3).

Another advantage is that the rules can therefore be tuned to act on more specific pieces of information from all layers. This also gives the operator of the backbone the advantage of dealing with packets in a much more sophisticated way. For instance, the present system might drop packets (if necessary) according to leaky bucket theories and the like. Additionally, a packet might be identified as not having any realtime requirements, and in case the communication link is congested (or slow, or inoperable), then that particular packet can be buffered. Prior devices provide such capabilities only through separate lookups, or separate accesses, and the like. The present invention performs all of such tasks in one step.

Performing only one lookup and/or rule-based analysis, at the onset, for all information (i.e. across all layers) can require considerably more processing power than prior systems that might only look at layers 2 and 3. However, such prior systems take up more resources in later operations by performing other lookups or rule-based directions. Moreover, backbones of data networks, generally need to be set up according to peak data transfer rate requirements. This can become very expensive because a system designer will need to lay out every router to account for the required peak performance at each node. On average, however, each router might only have loads ranging from 15–50%; nevertheless, a design would have to over-provision a network by a factor of two in order to account for peak periods. In the end, this leads to considerably greater expenses in forming and maintaining the infrastructure.

In contrast, the present system provides an intelligent routing mechanism to efficiently make use of a network, wherein loads are evened out across the networking nodes. The present system can buffer certain packets that do not necessarily have realtime requirements, and will do so via a single step. While the present system might requirement additional hardware or processing power at the outset, such hardware (and/or processing power) is much less expensive and easier to implement than having extra nodes in a generally inefficient system. By necessitating approximately a factor of two fewer nodes to make up the infrastructure of a data network, the present system will provide overall savings in the end.

Accordingly, one aspect of the present invention described herein provides for an apparatus and method that performs lookup and classification of data packets—from all available data across all layers—in a single step for the entire data flow. The packets are thereafter routed (or buffered, or the like) according to such initial processing of all the packets. The present system also applies a set of rules to the data patterns in the IP flow in order to further direct the packets. To apply the rules on a real-time basis, a JIT (Just In Time) compiler can be used. Otherwise, the rules might be imposed on runtime basis without a JIT compiler. In the following description, numerous specific details are set forth in order to provide a thorough understanding of the present invention. It will be apparent, however, to one skilled in the art, that the present invention may be practiced without some or all of these specific details. In other instance, well known structures and/or process steps have not been described in detail so that the present invention is not unnecessarily obscured.

Referring now to FIG. 1, a prior art block diagram 100 is shown of a representative IP flow 102. The IP flow 102 includes a series of data packets 104, 106, and 108 that are interspersed as part of the stream of data. Each IP packet includes certain respective header information 110, 112, and 114. The headers are used to facilitate sending the packet over a network or the like. The header information is also used by the TCP software to successfully rearrange the packets when they arrive at a destination machine.

Referring now to FIG. 2, a prior art block diagram 200 is shown of certain representative fields that might be contained in the header of a data packet. Such header information might typically consist of 1500 or more bytes of information. Example fields shown include an IP header field 202, and Application header field 204, and a Class of Service header field 206. The IP header field 202 would include information such as the Source Address (SA) and the Destination Address (DA) for the data packet. The SA and DA are used to forward or switch a packet to a predetermined output port. The Application header field 204 would include information such as the type of application that sent the packet. The type of application might warrant different treatment for the packets, particularly if the application requires time-sensitive data. The Class of Service header field 206 would include a level of service that has been assigned to the particular packet of information. According to the present invention, four classes of service might exist including platinum service, gold service, silver service, and bronze service. The service level can be used to further decide the appropriate routing speed to be applied to the data packet. As shown by the continuation arrow 208, many other types of header data might also be used. According to the present invention, any such IP flow packet or header information, as shown in FIGS. 1 and 2, might be used during the initial step of routing and classifying the data.

According to present problems in the field of IP data transmission, the bandwidth usage of network devices is greater at certain times of the day, as opposed to others. In general, such peaks might occur at 9 am, 12 noon, 3 pm and then again at 7 pm when user's log-on from home. Referring now to FIG. 3, a representative plot is shown of bandwidth usage throughout a typical twelve-hour period for an example network. As shown, the bandwidth usage increases as the day progresses, and peaks at around 2–4 pm in the afternoon. Usage tapers off thereafter. This relative problem might be solved by shifting certain data traffic from the peak time of 2–4 pm to other times that do not normally entertain as much traffic. For non-time-sensitive applications, such as certain kinds of email, the data packets might be re-directed and sent at different times throughout the day. According to the present invention, the routing and classification of the packets can result in buffering of such packets in order to smooth out traffic flows across various data paths, and during different times of the day.

Figure 4:
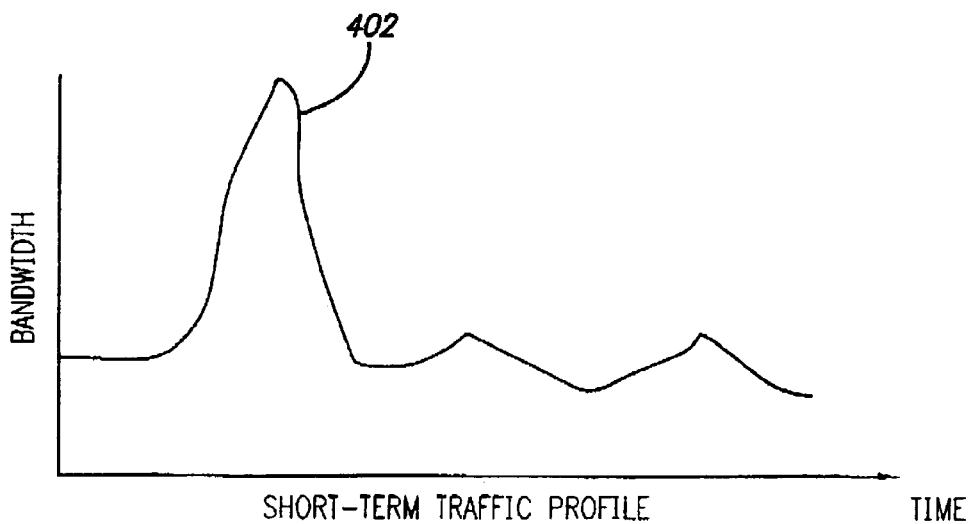
FIG. 4 is a diagram showing a short-term profile of bandwidth usage versus time, as derived from FIG. 3.

Referring now to FIG. 4, a representative plot is shown of bandwidth usage for a short-term traffic profile, e.g. the profile being any portion of time from the plot of FIG. 3. A large peak is shown at 402, with lower bandwidth usage occurring in the surrounding regions. Even for this profile, the ideal situation would be to shift the packets being sent at (or near) the peak 402 in either direction time-wise to thereby flatten out the bandwidth usage over the sub-frame range. Such data packet shifts might range anywhere from minutes, to seconds, to fractions of a second By using the present invention and applying certain compiled rules (i.e. via JIT, or runtime compiler, or the like), the bandwidth usage can be evened out over any range of time.

Figure 5:
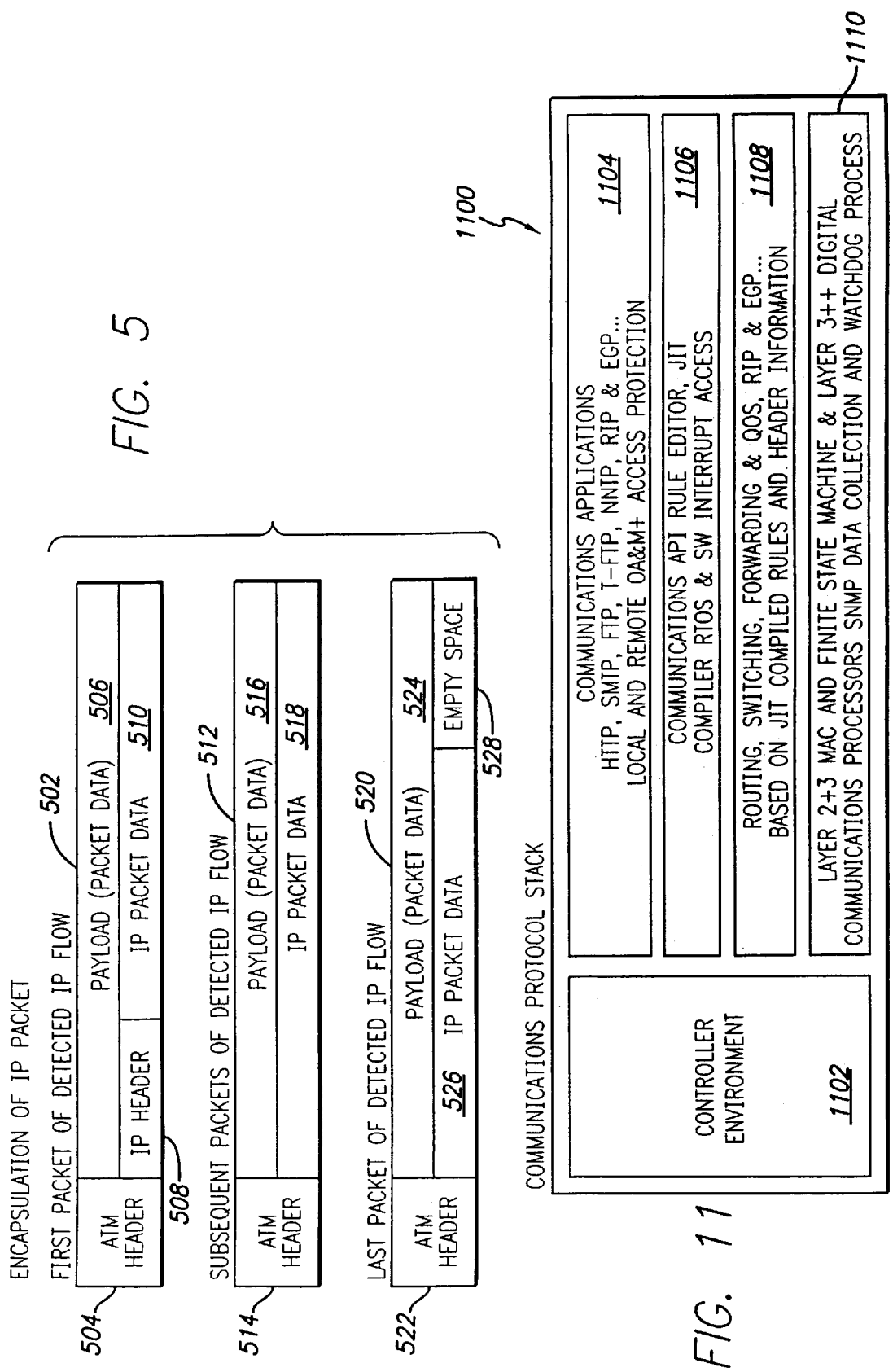
FIG. 5 is a block diagram showing encapsulation of IP packet data within an IP flow.

The present invention is also capable of handling encapsulated IP data, in order to apply the given rules to data patterns within the IP flow. In telecommunications, encapsulation is the inclusion of one data structure within another structure so that the first data structure is hidden during a certain operation on the data. For example, a TCP/IP-formatted data packet can be encapsulated within an ATM frame. ATM (asynchronous transfer mode) is a dedicated-connection switching technology that organizes digital data into 53-byte cells or packets and transmits them over a medium using digital signal technology. Individually, a cell is processed asynchronously relative to other related cells and is queued before being multiplexed over the line. Within the context of transmitting and receiving the ATM frame, the encapsulated packet is simply a stream of bits between the ATM data that describes the transfer. Referring now to FIG. 5, a block diagram is shown that illustrates the encapsulation of an IP packet. A first packet of detected IP flow 502 is shown. The first packet 502 includes an ATM header 504, a payload (or packet data) 506, an IP header 508, and IP packet data 510. Subsequent packets of detected IP flow are shown as 512, which include an ATM header 514, a payload 516, and IP packet data 518. The last packet of detected IP flow 520 is shown to include an ATM header 522, a payload 524, IP packet data 526, and certain empty space 528. Even with such encapsulation, the present invention will parse through the IP flow to apply routing and classification to all data packets, using all available information, and in a single step.

In the present invention, the decapsulation process can be performed in hardware or software associated with the apparatus. Alternatively, the present parser can ignore the header and trailer of the encapsulating entity.

Figure 6:
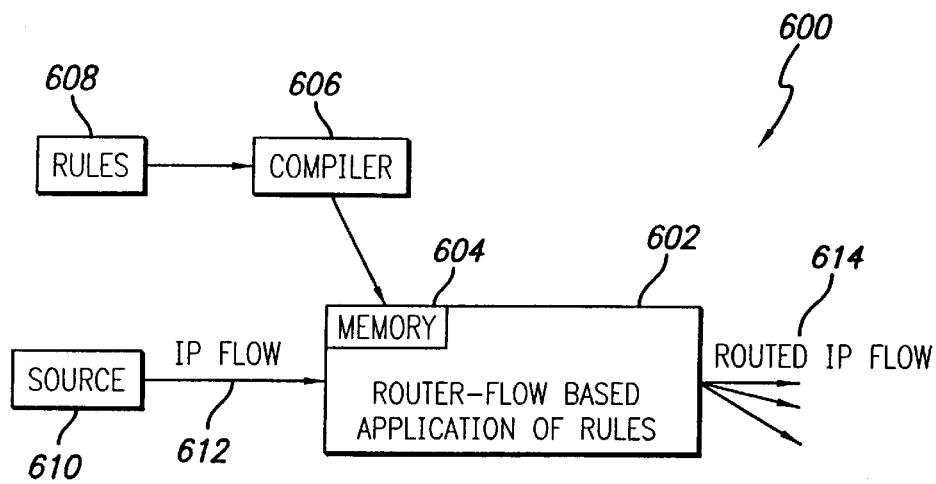
FIG. 6 is a block diagram showing certain representative elements used in implementing a prior art routing configuration.

Referring now to FIG. 6, a block diagram 600 is shown of certain representative elements that might be used to implement a prior art configuration. A router 602 is shown having a memory or storage means 604. A set of rules 608 are written and arranged in a high level language. The rules 608 are fed into a compiler 606 that generates executable code. The code is downloaded into the memory means 604. A source 610 sends an IP flow 612 to the router device 602. The router might typically analyze layers 2 and 3 (of the OSI layers) and thereafter route (or forward) the packets based upon information in these two layers. This involves a first lookup operation. If further operations are to be performed on the packets, then certain rules might be applied, and this involves still other lookup operations. The router then applies the rules, which have been compiled and fixed in memory 604, to the IP flow in order to determine routing of the various packets contained therein. The IP flow is then routed, as shown by element 614, to various destination addresses. In general, such prior systems are not fully able to maximize the bandwidth usage of a network due to inefficiencies caused by (for instance) multiple lookups.

Figure 7:
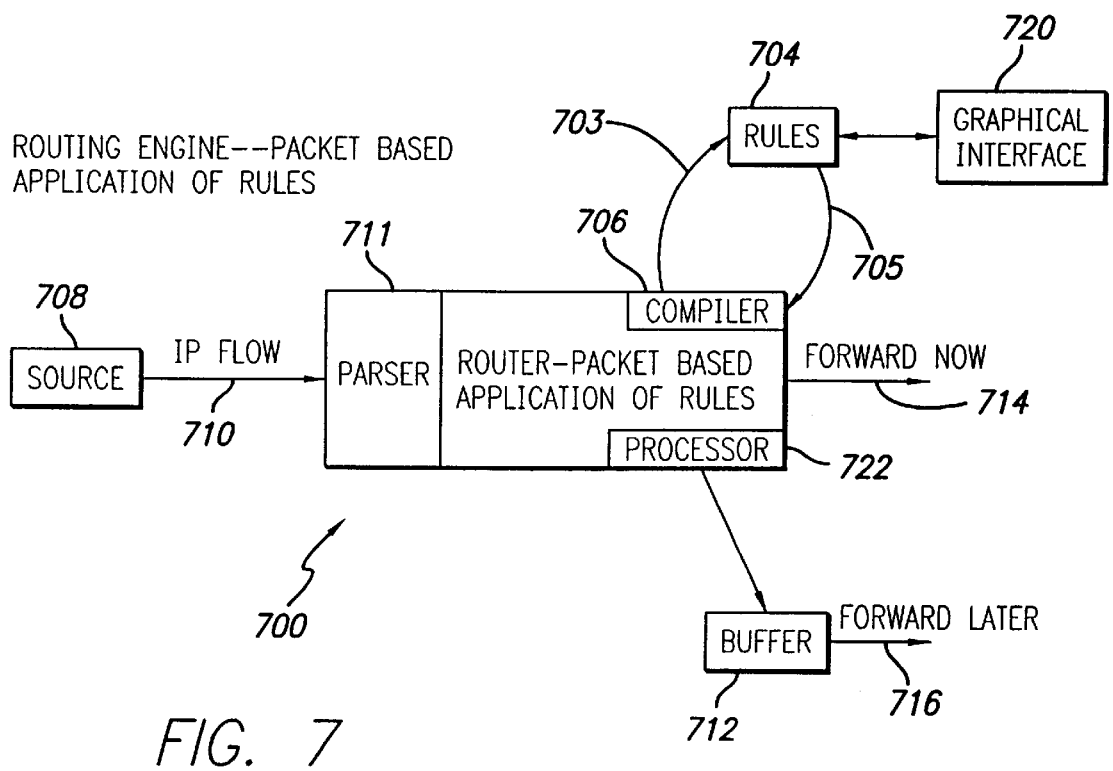
FIG. 7 is a block diagram showing certain representative elements that might be used to implement at least one embodiment of the present invention.

Referring now to FIG. 7, a block diagram 700 is shown of certain representative elements that might be used to implement a configuration according to the present invention. The configuration represents a routing engine, which takes incoming data packets and performs routing operations on the packets according to compiled rules. Note that while a compiler (in general) is shown, a runtime compiler, or Just-In-Time (JIT) compiler, or any other type of compiler might also be used. A router 702 is shown with packet based application of rules. The router has associated with it the compiler 706. A set of rules 704 are developed or maintained in a language such as ASN1 (Abstract Syntax Notation One). Other high level (or abstract) languages might also be used such as Pascal, C, C++, and the like, with the only requirement being that they can be readily compiled by the compiler 706. The converts the ASN1 commands into instructions for the processor 722 which allows it to filter out packets or filter out patterns, detect patterns, and then perform some action upon the detected pattern.

A source 708 is shown sending an IP flow 710 to the router device 702. A parser 711 analyzes the bit patterns and/or fields within the IP flow. The entire IP flow is processed and all information pertaining to all levels, and all rules, is used to route and classify the any data packets according to any rule. This entire process is done via one lookup operation at the outset. The router can be configured to continually retrieve rule information (via 703) and return compiled results (via 705) from the set of rules 704. The rules might be generated via a graphical interface (e.g. element 720) that provides interaction for entering and revising the rules, in a hierarchical manner, or otherwise. The rules might also be retrievably stored in any of a variety of storage mediums (e.g. electronic memory, hard drive, etc.). Such rules are applied without any further lookup operations being performed. The initial analysis of the entire IP flow is used to apply all such rules. Example results of the applied rules include forwarding the packet immediately, as shown by element 714. Alternatively, a buffering device 712 might be used and the packet would be buffered for later forwarding via 716. In this manner, the packets can be sorted and delayed according to various criteria, such as header information (e.g. class of service, or the like). The rules might also apply to data patterns anywhere within the general IP flow (whether encapsulated data or not), such as patterns relating to intruders and the like.

Figure 8:
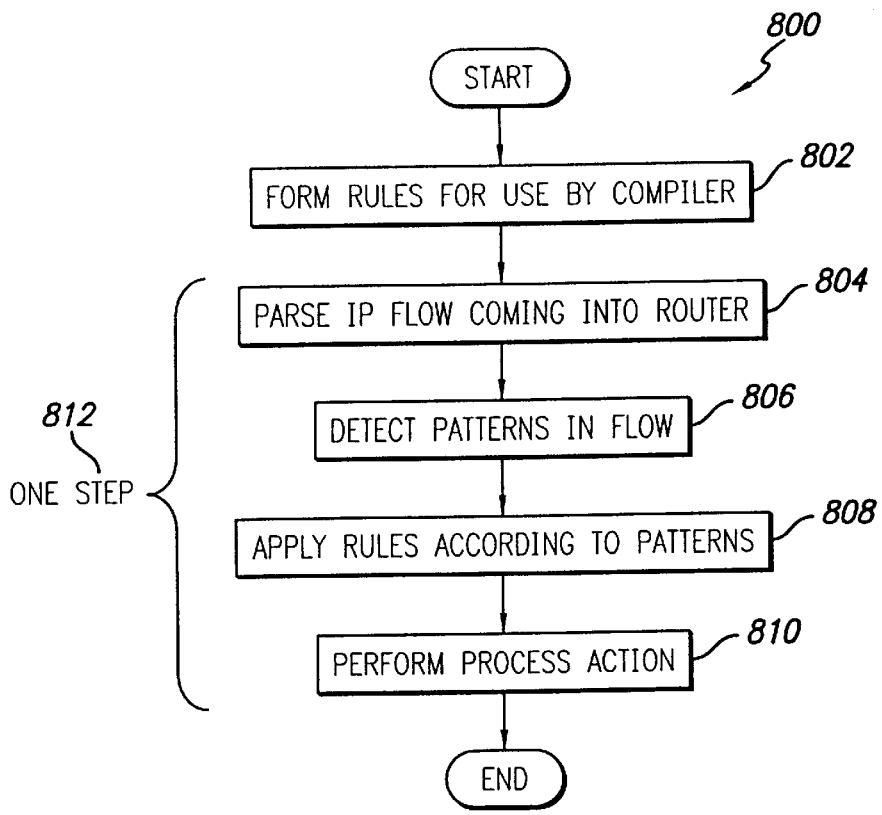
FIG. 8 is a flowchart of certain representative steps that might be used to implement at least one embodiment of the present invention.

Referring now to FIG. 8, a flowchart 800 is shown of certain representative steps which might be used to implement at least one aspect of the present invention. According to this chart, all such steps would be performed as part of an initial lookup step which utilizes all information to route and classify any packet within the flow. In step 802, the rules—for use by the JIT compiler (or otherwise) are formulated and stored for access by the JIT compiler device. In step 804, the IP flow coming into the router is parsed. Parsing technology is well known and the present invention might employ any of these techniques. As mentioned above, the parsing would be applied across the entire IP flow, and encapsulated data patterns would also be separated for analysis according to the formulated rules. In step 806, certain patterns are detected within the IP flow. The patterns to be detected are determined essentially by the formulated rules. A certain rule will present a pattern of importance to be detected and acted upon within the IP flow. In step 808, the rules are applied according to the corresponding patterns. For instance, a certain bit pattern (e.g. the Application field set to indicate "low priority email") might then carry a rule for routing the associated packet via a lower priority transfer protocol. In this step, the all data packets in an IP flow are classified according all the information available, i.e. rules, ports, etc. In step 810, a process action is performed on the packets according to the set of rules. The packets can be modified to reflect the routing decisions applied. The steps 804 through 810 can be performed in (at least) a single step 812 without having to again re-classify the data packet.

A lower priority packet might be buffered for later forwarding. This will further facilitate one beneficial goal of more evenly distributing the bandwidth usage of the network over time (or otherwise).

The present invention provides for looking at every part of a packet, with the packet being part of an IP flow coming into the routing engine. Many different patterns might be defined (via the JIT—or otherwise—compiled rules) for pattern comparison. Once a pattern is detected, a variety of actions might be performed. For instance, a pattern might be changed, modified, or altered. The destination address might be exchanged for another. As a particularized example, if a user's network interface card goes out of service, and it is determined that the user is still receiving many packets, then those packets might need to be re-directed by simply exchanging the destination address. Otherwise, the prior art process is generally inefficient in that the packet is sent to the user, the MAC determines that the user does not exist anymore, a message is sent back to the system, and then a conversion takes place thereafter.

Another example would include a firewall application. For instance, an intruder to a system might be detected, via pattern comparisons and the like established as a function of certain rules. The intruder will have a certain IP address. The intruder's IP stream (or packets) are discarded.

It should be further noted that in parsing the entire IP flow, a virus or the like might be detected in the payload (or other bits) of the IP flow. Relevant infected packets or bit patterns might thereafter be discarded, and/or corrected.

Traffic flow from "spammers" might also be eliminated by detecting the source address pattern of machines sending such undesired information, and thereafter dropping any packets from that source address.

Still other rules might be associated with counting the various packets, and routing as a function of the resulting count.

Figure 9:
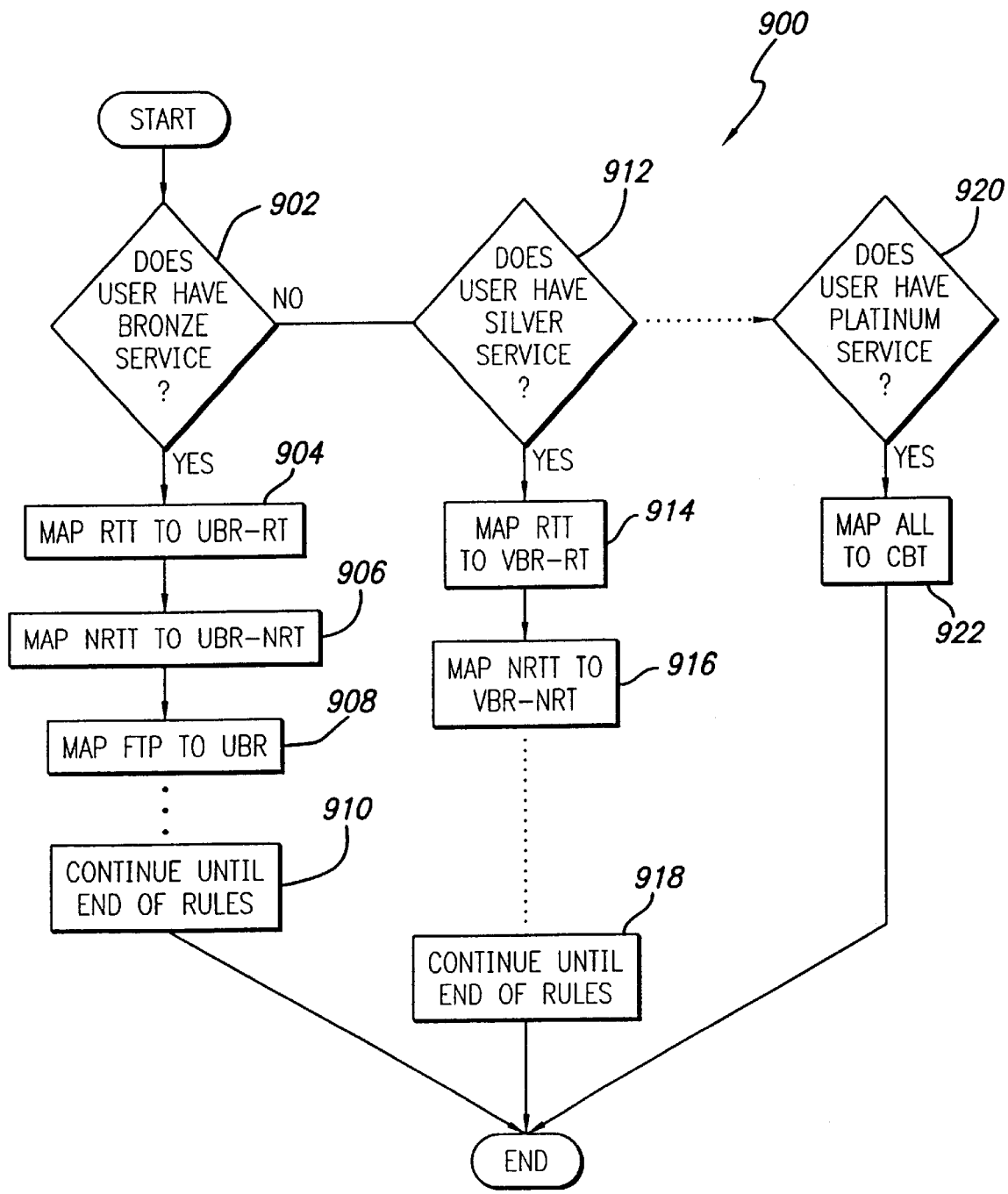
FIG. 9 is a flowchart of certain representative steps that might be used to implement the example JIT compiled rules according to the present invention.

Referring now to FIG. 9, a flowchart 900 is shown of certain representative steps that might be used to implement an example rule (or rules) according to the present invention. It should be noted that any rule can be applied to any packet according to the initial lookup performed according to the present invention. As per this example rule, an IP flow pattern is analyzed to see if the packet is associated with a certain level of service. Most typically the field (or bit pattern) to be analyzed would include the Class of Service field in the header information. A decision block 902 inquires whether the user has "bronze" service. If yes, then representative steps according to the implementation of certain rules are shown. In step 904, Real Time Traffic (RTT) packets are mapped to Unspecified Bit Rate (UBR)—Real Time (RT) routing capabilities. In step 906, Non-Real Time Traffic (NRTT) is mapped to UBR—Non-Real Time (NRT) routing capabilities. In step 906, File Transfer Protocol (FTP) packets are mapped to UBR. FTP is a standard protocol, and is essentially the simplest way to exchange files between computers on the Internet. Like the Hypertext Transfer Protocol (HTTP), which transfers displayable Web pages and related files, and the Simple Mail Transfer Protocol (SMTP), which transfers e-mail, FTP is an application protocol that uses the Internet's TCP/IP protocols. FTP is commonly used to transfer Web page files from the page creator to the computer that acts as the server for users on the Internet to view those pages. FTP is also commonly used to download programs and other files to a computer from other servers. FTP might be mapped onto a cheaper traffic class (e.g. UBR) as such associated packets are generally not bound by RT requirements, and if a packet gets lost, it is re-sent. Step 910, and the continuation symbols leading thereto, indicate that many other such rules might be invoked under this branch of decision block 902.

Hence, according to this rule branch, the various packets have been assigned the lowest priority transfer rate of UBR. In this instance, the Class of Service for the user is the lowest grade (e.g. "bronze"). In general, UBR is a traffic class (or policing class) of ATM that could be applied to Ethernet applications (e.g. versions 4 or 6) that has CoS implemented using an example application like DiffServ. UBR is a traffic contract that does not have a specified bit rate—instead implementations assigned UBR are assigned whatever bandwidth that is left over. In contrast, VBR (Variable Bit Rate) provides for a minimum and maximum bit rate that satisfies RT and NRT requirements. For instance, an MPEG3 (MP3) stream is compressed on the sending side. The MP3stream is then received, buffered, decompressed, and played on the receiving side. A VBR-NRT environment would work well for such a data stream, as there are no requirements for constant bit rates or real-time service. CBR (Constant Bit Rate) is the most expensive, as the rate is constant and will always take up a certain amount of bandwidth. Various traffic could thereby be sent more cheaply (or at a greater cost, as needed), but while still guaranteeing that traffic requirements are satisfied.

If, for instance, the user does not have "bronze" service, then decision block 912 next inquires whether the user has "silver" service. If yes, then step 914 shows the RTT packets being mapped to VBR-RT capabilities. Step 916 shows NRTT packets being mapped to VBR-NRT capabilities, and so forth. Step 918 again shows a continuation until all such rules have been applied.

Continuation indicator 913 indicates that other service classes (e.g. "gold") are also similarly checked, and associated rules are applied. Decision block 920 inquires whether the user has "platinum" service. If yes, then all packets are mapped to CBT capabilities.

Figure 10A:
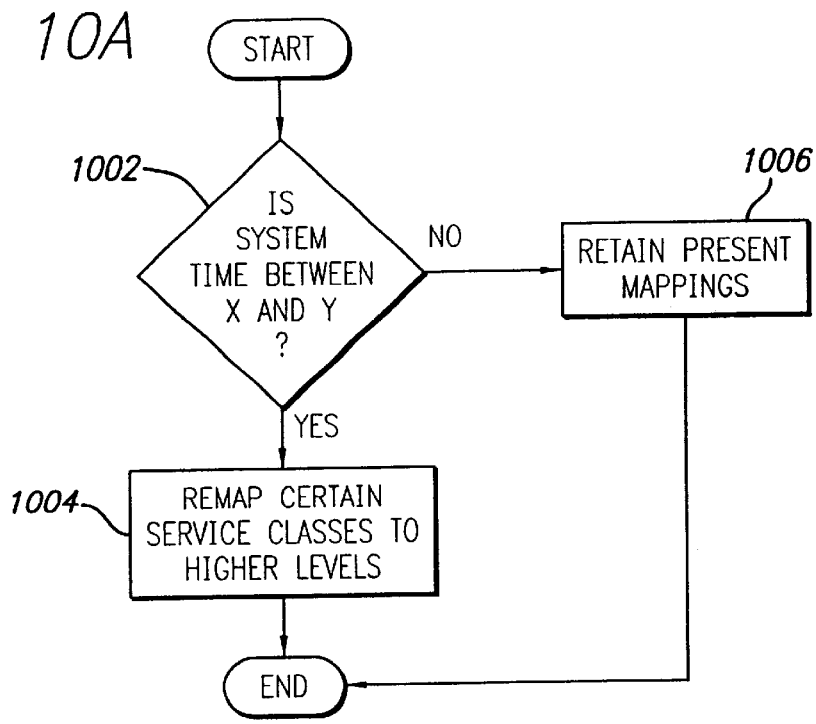
FIG. 10A is a flowchart of certain representative steps that might be used to implement the example JIT compiled rules according to the present invention.

Referring now to FIG. 10A, yet another representative flowchart of an example rule is shown. Many networks have lower usage rates during off-peak hours. As such, this rule shows a decision block 1002 that inquires whether the system time is between a certain time X and another time Y. If yes, then step 1004 shows the re-mapping of certain service classes to higher levels. Hence, during these off-peak hours, all data packets sent by such a user will be sent at faster rates. If the system time is not between X and Y, then step 1006 shows the present mappings for the system being maintained.

Figure 10B:
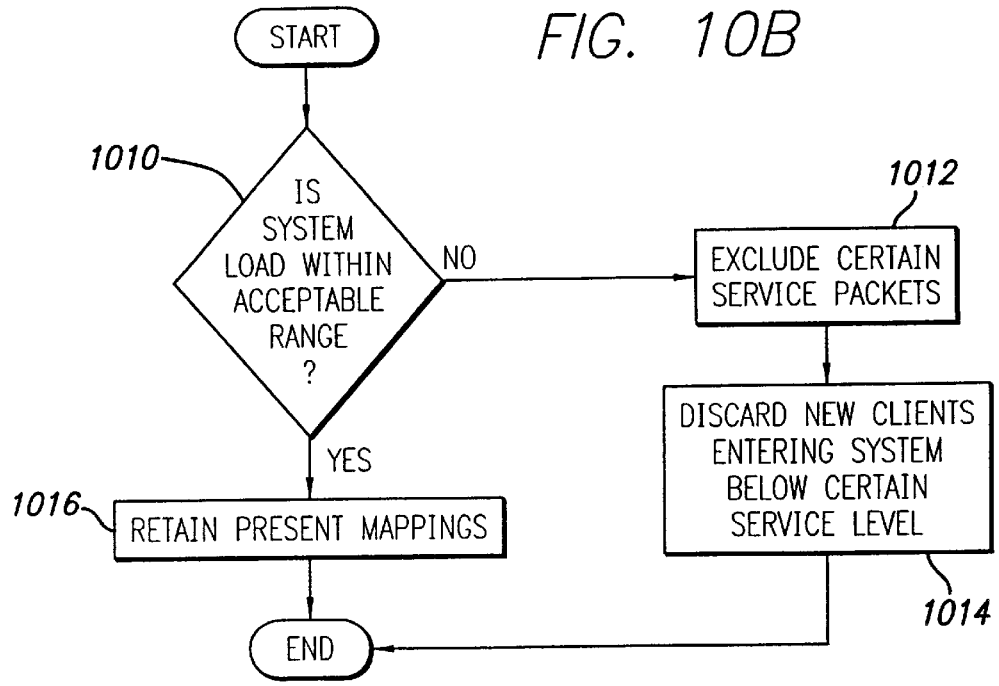
FIG. 10B is a flowchart of certain representative steps that might be used to implement the example JIT compiled rules according to the present invention.

Referring now to FIG. 10B, still another representative flowchart of an example rule is shown. Networks can become overloaded and shut down (or be damaged) if the traffic becomes too great. For instance, an SNMP statistical data collection traffic class can provide indications of an overload situation. As a result, certain traffic might need to be discarded in order for the network to survive and remain functional. As for users that have already established an IP connection, it might be considered a waste of bandwidth to throw away those data packets. There might still be a portion of data packets that are in transition, and might cause the transmitting station to re-send the packet. Therefore, it is better to cut off such packets altogether. Decision block 1010 inquires whether the system load is within an acceptable range. If not, the step 1012 directs the system to discard packets for certain service levels. Step 1014 also shows the system discarding any new clients that might enter the system (e.g. below a certain service level, or alternatively all new clients). If the system load is within an acceptable range, then step 1016 shows the system retaining it present configuration settings.

As a result of the application of any such rules, certain representative traffic types, traffic priorities, and service levels are established. These types, priorities, and levels can then be mapped onto existing ATM QoS (Quality of Service) definitions and assignments. On the Internet and in other networks, QoS employs the premise that transmission rates, error rates, and other characteristics can be measured, improved, and, to some extent, guaranteed in advance. QoS is of particular concern for the continuous transmission of high-bandwidth video and multimedia information. Transmitting this kind of content dependably is difficult in public networks using ordinary "best effort" protocols. Using the Internet's Resource Reservation Protocol (RSVP), packets passing through a gateway host can be expedited based on policy and reservation criteria arranged in advance. Using ATM, a company or user can preselect a level of quality in terms of service. QoS can be measured and guaranteed in terms of the average delay at a gateway, the variation in delay in a group of cells, cell losses, and the transmission error rate. Mapping can also be done onto Ethernet type Class of Service (CoS) definitions like MPLS and DiffServ.

It is to be understood that the above examples of rule implementation are for representative purposes only, and are not meant to limit the present invention to the implementation of those particular rules. In general, any rule related to the routing of IP packets based upon the analyzed data patterns within the IP flow could be similarly implemented. Moreover, individual rules might apply to any packet within the flow.

Referring now to FIG. 11, a representative block diagram is shown of a communications protocol stack according to the present invention. A controller environment block 1102 interacts with the various levels shown to the right. This might consist of a Linecard controller environment, or other similar incarnations of routers, or stand alone routers. At the highest levels, block 1104 shows communication applications. Also shown are protocols including, for instance, HTTP (Hypertext Transfer Protocol), SMTP (Simple Mail Transfer Protocol), FTP (File Transfer Protocol), T-FTP (Trivial FTP), NNTP (Network News Transfer Protocol), RIP (Routing Information Protocol) & EGP (Exterior Gateway Protocol), and so forth. Thereafter, this level includes local and remote OA&M (Operation Administration & Maintenance), and access protection. The next levels are shown in block 1106, and include communications API (Application Program Interface), the rule editor (graphical or otherwise), JIT compiler, RTOS (Real Time Operating System), and SW (software) interrupt access. Block 1108 shows levels involving routing, switching, forwarding, and QoS (Quality of Service) based on JIT compiled rules and header information, RIP, EGP, and so forth. Block 1110 shows a Layer 2+3 MAC and Finite State Machine (FSM), Layer 3++ Digital Communications Processors, SNMP (Simple Network Management Protocol), and Watchdog processes. The lowest levels (e.g. L1) would generally be handled by hardware implementations due to speed requirements. Higher levels (e.g. L2+) might be implemented via software, or a combination of both hardware and software. Even higher levels might be implemented entirely by software. Note that it is intended that even the lowest levels might be software based if the processing tasks could be performed quickly enough to facilitate wirespeed, or near wirespeed processing of the IP packets or data.

A variety of hardware configurations might be used to implement the present invention. For instance, a Linecard, or stand alone router might be used. Referring now to FIG. 12, a representative router (or router engine) configuration 1200 is shown. An internal cross bar 1202 serves to interconnect and facilitate data exchange between the various elements. A secondary cross bar (not shown) in the system backplane, could provide even higher performance levels. Block 1204 supplies MAC+FSM (i.e L1 . . . L2). A first high speed computer or processor 1206 and second high speed computer or processor 1208 interact in parallel to process (and parse) the IP flow. Accordingly, the entire packet/flow/stream is processed in order to detect the aforementioned patterns and thereby apply the aforementioned rules. The high speed computers or processors might include a RISC processor, or the like. The dual or parallel processors (shown here as 1206, 1208), are used to fulfill the processor intensive task of considering all information for all levels, as well as the application of the rules, during the initial lookup operation described above, for the entire IP flow. Further shown is a DRAM interface for interim memory storage purposes, including for instance the rules and routing tables. A system interface 1212 is shown which might provide system level control and interaction. Block 1214 shows a bus interface unit to the backplane of the system. This would include OSI layer 3 (e.g. networking and routing) interaction. Block 1216 shows further logic for handling temperature and overcurrent sensor and emergency powerdown information.

In such a configuration, the traffic stream will proceed through the routing engine, and will be monitored in real-time. It is desirable that the packets be routed (or altered, or modified) in as few cycles as possible, so that the configuration will be a "wirespeed" system. In practice, the present system operates at a sufficient rate so that a modification (or the like) of any part of the IP stream, IP packet, or IP flow going through the router engine will be performed generally within the same amount of time that the information would be stored in the router engine. Such hardware would also be associated with software. The software allows the system to detect any given pattern in the IP packet/flow/stream and perform the required action on the data according to the associated rule. It should be noted that such software might be applied—independently of the shown hardware configurations—to an existing router configuration. Hence, existing routers might be made rule-based according to the present invention via the software uploads (or the like) onto the routing device.

A variety of transport structures and network configurations might benefit from the present invention. The processing of the entire data flow, in an initial lookup step according to the present invention, is generally applicable to any transport structure. Examples include Ethernet compatible networks, ATM networks, and encapsulated IP traffic transported over such networks. Additional transport infrastructures include SDH/SONET, or WDM/DWDM transport streams. Dense wavelength division multiplexing (DWDM), for instance, is a technology that puts data from different sources together on an optical fiber, with each signal carried on its own separate light wavelength. Using DWDM, up to 80 (and theoretically more) separate wavelengths or channels of data can be multiplexed into a lightstream transmitted on a single optical fiber. In a system with each channel carrying 2.5 Gbps (billion bits per second), up to 200 billion bits can be delivered a second by the optical fiber. DWDM is also sometimes called wave division multiplexing (WDM). Since each channel is demultiplexed at the end of the transmission back into the original source, different data formats being transmitted at different data rates can be transmitted together. Specifically, Internet (IP) data, SONET data, and ATM data can all be travelling at the same time within the optical fiber. DWDM promises to solve the "fiber exhaust" problem and is expected to be the central technology in the all-optical networks in the near future. DWDM replaces time-division multiplexing (TDM) as the most effective optical transmission method. TDM is the primary approach of many of today's networks, but DWDM systems are expected to be tested and deployed in increasing numbers.

Referring now to FIG. 13, a protocol stack IP is shown for transmitting packets according to the present invention over a Gigabit Ethernet (GbE) device. The client side 1302 includes a protocol stack having (at least) an Application layer 1304; an HTTP, POP3, (etc.) layer 1306; a TCP layer 1308; an IP layer 1310; and a Physical layer 1312. The router side 1320 includes an Application header 1322 leading into a TCP Port number 1324. IP block 1326 interacts with the Physical layer 1328. Physical layer 1328 interacts with Physical layer 1312 from the client side 1302. IP block 1330 is in communication with IP block 1326 and interacts with Internal cell bus 1332. An internal backplane 1340 receives signals 1341 from the Internal Bus 1332 (i.e. Internal Cell Bus, or otherwise).

Referring now to FIG. 14, a protocol stack IP is shown for transmitting packets according to the present invention over an ATM device. The client side 1402 includes a protocol stack having (at least) an Application layer 1404, an HTTP, POP3, (etc.) layer 1406, a TCP layer 1408; an IP layer 1410; an ATM AAL5 layer 1412; and a Physical layer 1414. The router side 1420 includes an Application header 1422 leading into a TCP Port number 1324. IP and VCI/VPI (Virtual Connection Identifier/Virtual Path Identifier) block 1426 interacts with the Physical layer 1428. Physical layer 1428 interacts with Physical layer 1414 from the client side 1302. IP and VCI/VPI (Virtual Connection Identifier/Virtual Path Identifier) block 1427 is in communication with IP and VCI/VPI block 1426 and interacts with Internal Bus 1430. An internal backplane 1440 receives signals 1441 from the Internal Bus 1430.

Figure 15:
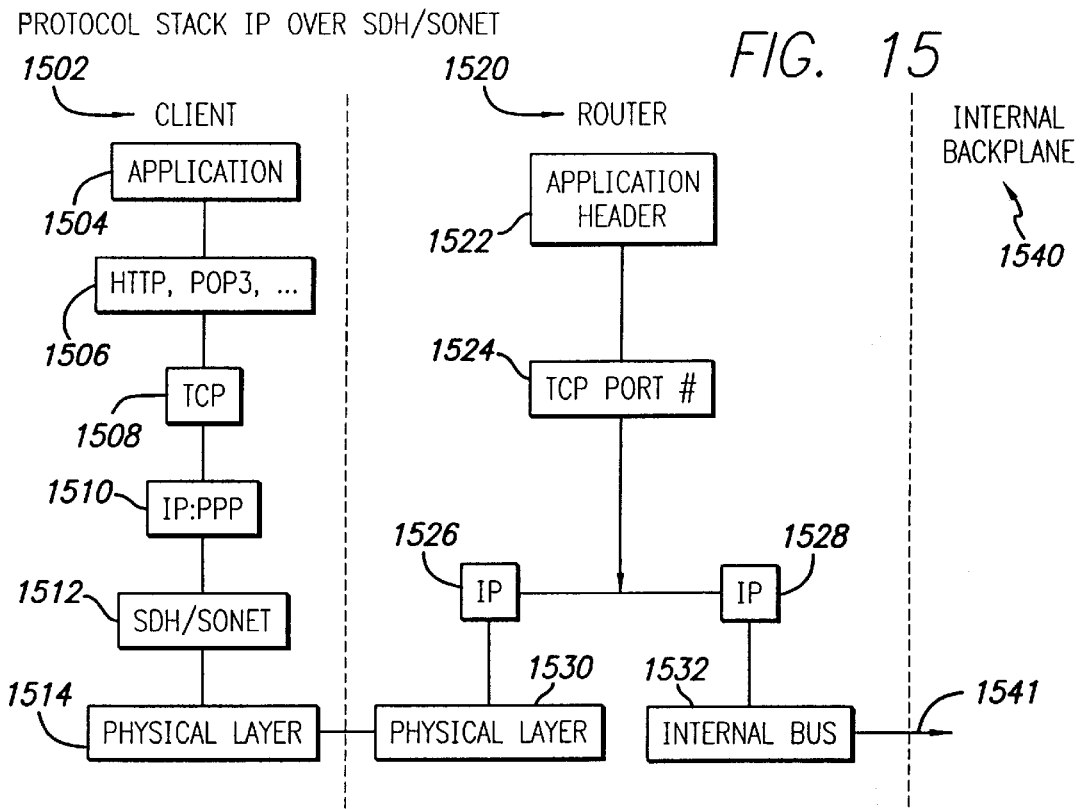
FIG. 15 illustrates a representative protocol stack for one implementation of the present invention over SDH/SONET.

Referring now to FIG. 15, a protocol stack IP is shown for transmitting packets according to the present invention over an SDH/SONET device. SDH (Synchronous Digital Hierarchy) is a standard technology for synchronous data transmission on optical media. It is the international equivalent of SONET. SONET is the U.S. (ANSI) standard for synchronous data transmission on optical media. The client side 1502 includes a protocol stack having (at least) an Application layer 1504; an HTTP, POP3, (etc.) layer 1506; a TCP layer 1508; an IP:PPP (Point to Point Protocol) layer 1310; an SDH/SONET layer 1512; and a Physical layer 1514. The router side 1520 includes an Application header 1522 leading into a TCP Port number 1524. IP block 1526 interacts with the Physical layer 1530. Physical layer 1530 interacts with Physical layer 1514 from the client side 1502. IP block 1528 is in communication with IP block 1526 and interacts with Internal Bus 1532. An internal backplane 1540 receives signals 1541 from the Internal Bus 1532.

Figure 16:
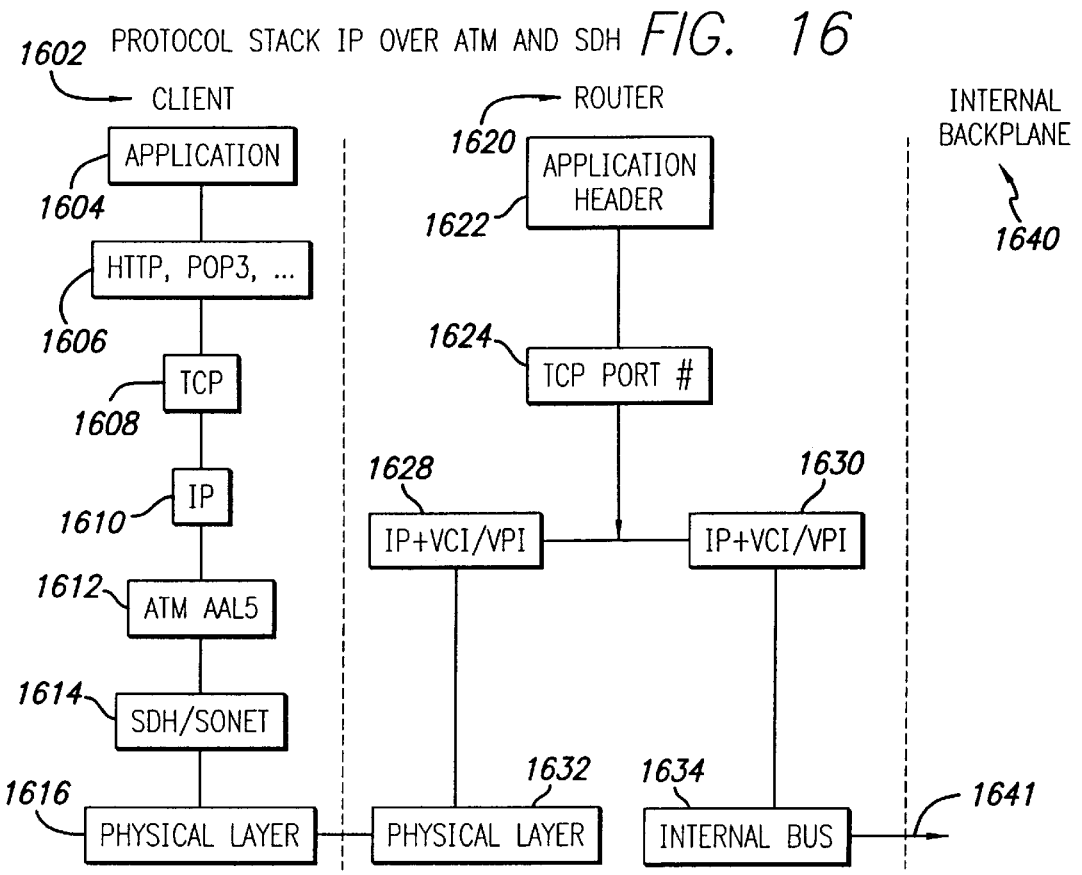
FIG. 16 illustrates a representative protocol stack for one implementation of the present invention over ATM and SDH.

Referring now to FIG. 16, a protocol stack IP is shown for transmitting packets according to the present invention over an ATM and SDH device. The client side 1602 includes a protocol stack having (at least) an Application layer 1604; an HTTP, POP3, (etc.) layer 1606; a TCP layer 1608; an IP layer 1610; an ATM AAL5 layer 1612; an SDH/SONET layer 1614; and a Physical layer 1616. The router side 1620 includes an Application header 1622 leading into a TCP Port number 1624. IP and VCI/VPI block 1628 interacts with the Physical layer 1632. Physical layer 1632 interacts with Physical layer 1616 from the client side 1602. IP and VCI/VPI block 1630 is in communication with IP and VCI/VPI block 1628 and interacts with Internal Bus 1634. An internal backplane 1640 receives signals 1641 from the Internal Bus 1634.

Figure 17:
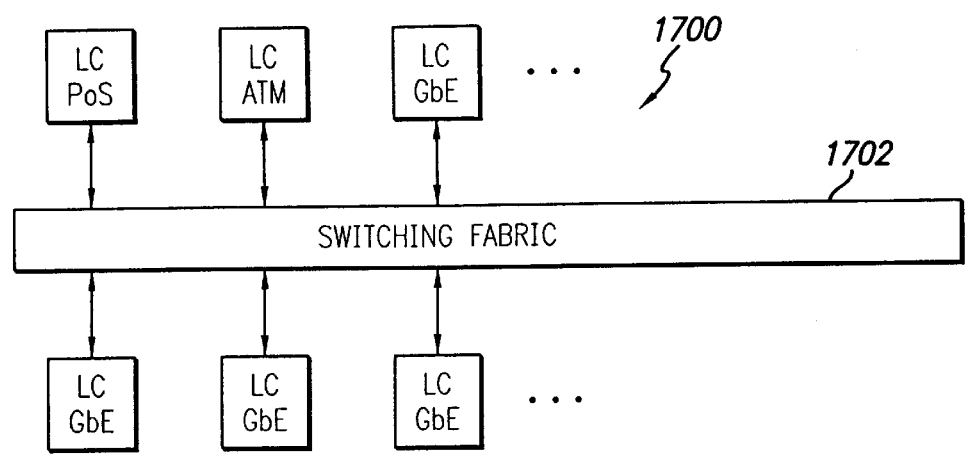
FIG. 17 shows a block diagram of a distributed system router configuration according to the present invention.

Referring now to FIG. 17, a block diagram 1700 is shown of certain representative elements which might be used in a distributed system. While the present system might be configured in many ways, a distributed system provides many advantages in terms of speed and modularity. A central switching fabric 1702 (i.e. bus, or the like) is shown with a plurality of linecards (LCs) interfacing with the fabric. Each different type of networking technology connects to the fabric using a different LC. LC 1704 shows PoS technology and LC 1706 shows ATM technology. The remaining LCs show GbE (Gigabit Ethernet) technology, which will typically comprise the majority of cards connected to such a distributed system.

Although the foregoing invention has been described in some detail for purposes of clarity of understanding, it will be apparent that certain changes and modifications may be practiced within the scope of the appended claims. For instance, the described router, JIT compiler, software, and the like, might be implement by (or in association with) include any such computer device. Therefore, the described embodiments should be taken as illustrative and not restrictive, and the invention should not be limited to the details given herein but should be defined by the following claims and their full scope of equivalents.

What is claimed:

1. An apparatus for applying rules to the processing of data packets over a network, the apparatus comprising:
    a network interconnecting device for directing packet based data over an associated network;
    a parser associated with the network interconnecting device for analyzing bit patterns from incoming IP flows of data packets;
    a rule generator for providing rules for processing the data packets according to the analyzed bit patterns;
    a compiler for compiling the rules, wherein the rules are applied to the bit patterns which are parsed from the IP flow; and
    a buffering device, the buffering device buffering packets for later forwarding according to rules applied to that type of packet.

2. The apparatus according to claim 1, wherein the networking interconnection device includes router functions, firewall functions, and/or gateway functions, and the rules relating to device functionality can be combined into a common set of rules for processing the data packets according to any set of rules.

3. The apparatus according to claim 2, wherein the functions include traffic policing.

4. The apparatus according to claim 3, wherein the packets are distinguished by different service levels.

5. The apparatus according to claim 2, wherein the functions include traffic shaper.

6. The apparatus according to claim 1, wherein the compiler is a Just-In-Time (JIT) compiler for achieving real-time application of the rules.

7. The apparatus according to claim 1, wherein the compiler provides runtime application of the rules.

8. The apparatus according to claim 1, wherein a processor is associated with the forwarding, parser, rule generator, and compiler devices.

9. The apparatus according to claim 1, wherein the rules can be edited via a graphical interface for real-time application to incoming IP flows.

10. The apparatus according to claim 1, wherein the analyzed bit patterns are derived from IP packet header fields.

11. The apparatus according to claim 1, wherein the analyzed bit patterns are derived from IP packet data.

12. The apparatus according to claim 1, wherein the analyzed bit patterns are associated with a virus and the packets are discarded.

13. The apparatus according to claim 1, wherein certain packets are discarded if the associated network is congested.

14. The apparatus according to claim 13, wherein the certain packets are discarded via a leaky bucket implementation.

15. The apparatus according to claim 13, wherein the certain packet has been assigned a low priority relative to other packets.

16. The apparatus according to claim 1, wherein the packets are modified according to the rules applied to that packet.

17. An apparatus for applying rules to the processing of data packets over a network, the apparatus comprising:
    a network interconnecting device for directing packet based data over an associated network;
    a parser associated with the network interconnecting device for analyzing bit patterns from incoming IP flows of data packets;
    a rule generator for providing rules for processing the data packets according to the analyzed bit patterns; and
    a compiler for compiling the rules, wherein the rules are applied to the bit patterns which are parsed from the IP flow and IP packet traffic types and priorities resulting from application of the rules are mapped onto existing Quality of Service (QoS) assignments.

18. An apparatus for applying rules to the processing of data packets over a network, the apparatus comprising:
    a network interconnecting device for directing packet based data over an associated network;
    a parser associated with the network interconnecting device for analyzing bit patterns from incoming IP flows of data packets;
    a rule generator for providing rules for processing the data packets according to the analyzed bit patterns; and
    a compiler for compiling the rules, wherein the rules are applied to the bit patterns which are parsed from the IP flow and IP packet traffic types and priorities resulting from application of the rules are mapped onto existing Class of Service (CoS) assignments.

19. A method for applying rules to the processing of data packets within an IP flow over a network, the method comprising:

formulating at least one rule for application to the data packets of an IP flow;

receiving an IP flow from a source;

parsing the IP flow to detect data patterns within the data stream;

applying the at least one formulated rule to classify all the data packets in at least one step before processing the data packets, the at least one rule being used to establish data traffic types, the data traffic types including assigned priorities.

20. The method according to claim 19, wherein the at least one rule is compiled using a just-in-time compiler, whereby the compiled rule is used to process the data packets according to the detected data patterns.

21. The method according to claim 19, wherein the at least one rule is compiled using a runtime compiler, whereby the compiled rule is used to process the data packets according to the detected data patterns.

22. The method of claim 19, wherein the data packet priority assignments are mapped onto mapped onto existing Quality of Service (QoS) assignments.

23. The method of claim 19, wherein the data packet priority assignments are mapped onto mapped onto existing Class of Service (CoS) assignments.

24. A method for applying rules to the processing of data packets within an IP flow over a network, the method comprising:

formulating a set of rules associated with each network interconnection device for application to the data packets of an IP flow;

receiving an IP flow into the forwarding device;

classifying the incoming data packets according to the rules and all other information available for the data packets;

modifying the data packets according to desired forwarding instructions, wherein the entire set of rules are applied to all incoming data packets during at least one step to determine forwarding for all the packets.

25. The method according to claim 24, wherein the traffic policing is applied in the at least one step without having to reclassify the data packets.

26. The method of claim 24, wherein the IP flow is encapsulated into network transport technologies.

27. The method of claim 26, wherein decapsulation is performed in hardware.

28. The method of claim 26, wherein decapsulation is performed in software.

29. The method of claim 24, wherein traffic policing functions are applied to the data packets.

* * * * *